Nov. 13, 1951 H. G. CORNEIL ET AL 2,575,258
REGENERATING AN IRON-CONTAMINATED CRACKING CATALYST
Filed Dec. 6, 1948 2 SHEETS—SHEET 1

Nov. 13, 1951 H. G. CORNEIL ET AL 2,575,258
REGENERATING AN IRON-CONTAMINATED CRACKING CATALYST
Filed Dec. 6, 1948 2 SHEETS—SHEET 2

Hampton G. Corneil,
James E. Schiller, INVENTORS.
BY
AGENT.

Patented Nov. 13, 1951

2,575,258

UNITED STATES PATENT OFFICE 2,575,258

REGENERATING AN IRON-CONTAMINATED CRACKING CATALYST

Hampton G. Corneil and James C. Schiller, Baytown, Tex., assignors, by mesne assignments, to Standard Oil Development Company, Elizabeth, N. J., a corporation of Delaware Application December 6, 1948, Serial No. 63,664

5 Claims. (Cl. 252—417)

1

The present invention is directed to catalytic cracking of petroleum fractions. More particularly, the invention is directed to maintaining the activity of cracking catalysts by suppressing the detrimental effects of contaminants.

It is well known to employ catalysts for the conversion of relatively high molecular weight hydrocarbons, such as heavy naphtha, gas oil, petroleum residuum and the like, to relatively low molecular weight hydrocarbons, such as naphtha. A number of processes have been developed for accomplishing the aforementioned conversion, the best known commercially being the fixed bed type, the moving bed type, and the fluidized catalyst type.

In the fixed bed type, commonly known as the Houdry fixed bed process, the essential parts of the system comprise a furnace for vaporizing the charge hydrocarbon, a heat exchange vessel in which a bed of catalyst is formed, and fractionating equipment for recovering the reaction products. The catalyst in the bed is normally in the form of fairly large sized pellets. Normally three such vessels are employed which are operated in the following cycles: one vessel is undergoing the cracking operation, a second vessel is undergoing the regeneration cycle, and a third vessel is undergoing a purge or repressuring operation. During the cracking cycle vaporized hydrocarbon feed is exposed to contact with the catalyst for a sufficient time to convert the feed hydrocarbons to the desired product, conversion being maintained until such time as the catalyst becomes fouled by the deposition of carbon and other contaminants thereon. When the catalyst becomes fouled, further introduction of the hydrocarbon feed is discontinued and an oxygen-containing gas is introduced into the vessel, the temperature of the vessel and of the catalyst therein being maintained at a sufficiently high temperature to promote combustion of the carbon previously deposited on the catalyst during the cracking cycle. On completion of the regeneration cycle, the vessel is purged and/or repressured and otherwise readied for conversion of hydrocarbons.

In the moving bed process, commonly known as the Thermofor process, a reactor vessel, a regeneration vessel, together with catalyst elevators and recovery and feed systems, are provided. The reactor vessel includes catalyst and feed vapor inlets at the top of a reaction zone and a catalyst-vapor disengager and oil purge section at the bottom. The catalyst employed is ordinarily in the form of fairly large compressed pellets. Catalyst pellets flow downwardly by gravity along with the hydrocarbon vapors forming a solid moving bed. The depth of the catalyst bed in the reaction vessel is variable and controls space velocities within the reactor. In the purge section of the reaction vessel oil vapors and adsorbed oil are purged from the spent catalyst; and after being purged, the catalyst flows into a spent catalyst elevator which transports the catalyst to the top of a regeneration kiln where it is discharged into a hopper feeding into the kiln. The catalyst flows downwardly by gravity through the kiln and the carbonaceous deposit on the catalyst is removed therefrom by exposing the catalyst in the kiln to an oxygen-containing gas under combustion conditions. The regenerated catalyst flows from the kiln by gravity and is transported by an elevator to the feed hopper located above the reactor vessel. From this last mentioned hopper the regenerated catalyst is fed into the reaction vessel by gravity.

There are two types of fluid catalytic cracking operations, the so-called "downflow" operation and the "upflow" method. In the "downflow" type of fluid flow catalytic cracking operation there is provided a reactor and a regenerator. Finely divided catalyst, in suspension in vapors of the hydrocarbons to be cracked, is fed into the bottom of the reactor. The velocity of flow of the hydrocarbons is regulated so that hydrocarbon vapors carry the catalyst to an intermediate point in the reactor at which point there is a concentration of catalyst resulting in the forming of a dense zone from the outer annulus of which the catalyst particles drop to the bottom of the reactor from which they are withdrawn. Upon leaving the reactor the catalyst particles are picked up by a stream of hot air which carries them to the regenerator where the carbonaceous materials deposited on the catalyst in the reactor are consumed by combustion. The catalyst flow in the regenerator follows the same pattern as in the reactor with regenerated catalyst falling into a well in the lower section of the regenerator from which point it is fed back to the reactor. A detailed description of the downflow type of fluid flow catalytic cracking process may be found in a patent application by Conrad H. Kollenberg under U. S. Serial No. 547,553, filed August 1, 1944, now U. S. 2,407,374 issued September 10, 1946.

In the "upflow" type of fluid flow catalytic cracking a reactor and a regenerator are also employed. Finely divided catalyst, in suspension in vapors of the hydrocarbons to be cracked, is fed into the bottom of the reactor. The catalyst and the hydrocarbon vapors leave the reactor in a common stream and are separated in equipment provided for this purpose. The catalyst is then fed into the regenerator where the carbonaceous materials deposited on the catalyst in the reactor are burned off in the presence of controlled amounts of air. The catalyst from the regenerator is separated from the gaseous products of combustion and is then fed back to the reactor.

It is well known to employ any one of these types of cracking processes to convert relatively high molecular weight hydrocarbons, such as heavy naphtha or gas oil and the like, to relatively low molecular weight hydrocarbons, such as light naphtha, in the presence of catalyst comprising oxides of silicon and aluminum, silicon and zirconium, silicon and titanium, silicon and magnesium, certain specially activated natural clays, and the like at temperatures in the range of about 850° to 1100° F. When employing the fluid catalyst processes or the Thermofor process in carrying out these conversions, the ferrous metal and alloy equipment may be eroded by the catalyst particles as they circulate through and impinge on the equipment. The metal or metals that are removed from the equipment by erosion are picked up by and are accumulated in the catalyst. It is generally known that iron is the principal metal contaminant accumulated in the catalyst as a result of erosion. Other metals, such as nickel, chromium, manganese, vanadium, molybdenum, etc., accumulate in the catalyst as a result of erosion of equipment, but these metals are usually present in the catalyst in lower concentrations than iron, because iron is used more extensively in constructing moving catalyst types of catalytic cracking units than are alloys containing these latter-mentioned metals. Besides being picked up by erosion of the metallic equipment itself, metals and metallic oxide contaminants may also be introduced into the system with the feed stock, either in dissolved or suspended form. The catalyst employed in the Houdry fixed bed process is also subject to this last-mentioned source of contamination. It is well known to the cracking art that the presence of certain metals, such, for example, as iron and certain metal oxides, such, for example, as $Fe_2O_3$, in the catalysts are extremely detrimental to the efficiency of the catalysts. It has been shown that the presence of these metals and their oxides in the catalyst results in the formation and deposition of large amounts of carbon on the catalysts and in the production of large amounts of undesirable gases. This degradation of the catalysts by contaminating metals and their contaminating oxides, particularly iron and its oxides, occurs to such an extent that it is often necessary to discard large amounts of expensive catalyst.

It is, therefore, the main object of the present invention to provide a method whereby the detrimental effects of metal and metal oxide contaminants in catalysts employed in catalytic cracking processes are suppressed or substantially eliminated.

We have found that both metallic iron itself and its trivalent oxide, that is, $Fe_2O_3$, seriously reduce the activity of silica alumina cracking catalysts. It is also known of course that the metallic contaminants introduced with the feed and those picked up in the operating system are substantially oxidized in the regeneration zone inasmuch as air is employed in burning the carbon off the catalyst in the said zone. In the case of iron, the metallic iron will ordinarily be converted to its trivalent oxide, that is, $Fe_2O_3$. Other metallic contaminants, such as nickel, chromium, manganese, vanadium, molybdenum, etc., are also normally converted to their higher oxides.

In accordance with the present invention, the detrimental effects of the aforementioned metallic and metallic oxide contaminants in cracking catalysts employed in hydrocarbon conversion are substantially eliminated by subjecting the catalyst or a portion thereof to a reducing atmosphere after said catalyst has been subjected to an oxidizing atmosphere in the regeneration step. More particularly, this invention comprises the treatment of contaminated catalyst, which has been subjected to a reaction cycle wherein the catalyst is contacted with the hydrocarbon feed at a temperature in the range of 850° to 1050° F. and a regeneration cycle wherein carbonaceous deposits are removed from the catalyst by combustion in an oxygen-containing atmosphere at a temperature in the range of 950° to 1100° F., at some convenient point in the operating system with a reducing gas or a mixture of reducing gases of such nature and under such conditions as to effect the reduction of contaminating oxides to a substantially less detrimental state. Preferably the catalyst is so treated after it has been subjected to an oxidizing atmosphere under regeneration conditions and before it is again used for conversion of hydrocarbons. The catalyst, or a portion thereof, may be subjected to a reducing atmosphere either continuously or intermittently although the entire amount of catalyst employed in the reaction step is preferably subjected to a reducing atmosphere.

Although any reducing gas which will reduce the higher oxides of the contaminating metal to a less detrimental form of said metal is satisfactory, we prefer to use a reducing atmosphere containing hydrogen, carbon monoxide, methane, ethane, propane, etc. or gaseous mixtures containing any of these in combination. Ordinarily, it will be found preferable to employ a gaseous reducing mixture containing hydrogen, carbon monoxide or methane or mixtures containing any of these in combination. The volume of reducing gas employed in contacting the catalyst and the temperatures and pressures maintained should be adjusted so as to convert substantially the contaminating oxides present in the catalyst to compounds having substantially less or no detrimental effect on the activity of the catalyst. Depending upon the nature of the contaminating materials and upon the amount and kind of reducing atmosphere employed, the temperature at which the contaminated catalyst is contacted with the reducing atmosphere should be within the range of 850° F. to about 1100° F. Inasmuch as the pressure maintained in the several known catalyst cracking processes may differ and since the pressure maintained will have an influence on the reactions which take place in the reducing atmosphere, the temperature and throughput must be correlated in each instance with the pressure maintained in the particular unit. It should be remembered that the volume of reducing gas required will also depend upon the nature and amount of the contaminating oxides. When relatively small quantities of contaminating oxides are present in the catalyst, very small volumes of reducing gas and/or short contact times may be employed with satisfactory results, while when relatively large quantities of contaminating oxides are present in the catalyst larger volumes of reducing gas and/or long contact times will be required. Ordinarily, the amount of reducing gas employed should not be below 50 per cent of the theoretical amount required to reduce iron oxides in the catalyst to $Fe_3O_4$. When, for example, $Fe_2O_3$ is the chief contaminating oxide present in the regenerated catalyst, the temperature and amount of reducing gas supplied should be so chosen as to cause the conversion of $Fe_2O_3$ to $Fe_3O_4$. Inasmuch as metallic iron as well as $Fe_2O_3$ detrimentally affects the activity of the catalyst, reducing conditions should not be sufficiently severe to convert any substantial amount of the $Fe_2O_3$ to metallic iron. When the oxides of other contaminating metals comprise the chief contaminants in the catalyst, conditions should be so adjusted or chosen as to convert substantially all of said oxides to a non-detrimental form.

The desirability of subjecting silica alumina cracking catalyst to a reducing atmosphere in a manner hereinbefore described to convert substantially all of the $Fe_2O_3$ contained therein to $Fe_3O_4$ while avoiding conversion of the $Fe_2O_3$ to metallic iron is illustrated in the following table. The data presented in the following table were secured by making a series of five runs in a conventional catalytic cracking unit under the conditions of temperature, pressure, throughput, etc. indicated in the table when cracking a virgin gas oil having a boiling range of 485°–700° F. and having an A. P. I. gravity of 33.8. In each instance a silica-alumina type catalytic cracking catalyst was employed. In the first experiment fresh catalyst was employed, while in the remaining runs 0.5 weight per cent of an iron contaminant was incorporated in the catalyst, the particular iron contaminant being indicated in each instance in the data presented below:

TABLE

Catalytic cracking operations on gas oil

| Catalyst Used | Synthetic Silica-Alumina Catalyst | | | | |
|---|---|---|---|---|---|
| Condition of Catalyst | Contaminated | | | | Fresh [2] |
| Contaminant | Fe | Alpha-$Fe_2O_3$ | $Fe_3O_4$ | Gamma-$Fe_2O_3$ | None |
| Concentration of Contaminant, Wt. Per Cent | 0.5 | 0.5 | 0.5 | 0.5 | 0 |
| Product Yields: Liquid, Wt. Per Cent | 75.6 | 75.6 | 81.7 | 76.6 | 83.0 |
| Gas, Wt. Per Cent | 13.8 | 12.7 | 9.7 | 11.0 | 12.6 |
| Carbon, Wt. Per Cent | 10.6 | 10.8 | 8.6 | 12.4 | 4.4 |
| D+L at 400° F., Vol. Per Cent of Liquid Product | 34.2 | 33.6 | 45.2 | 31.0 | 60.0 |
| Conversion, Vol. Per Cent [1] | 48.2 | 47.1 | 52.4 | 45.5 | 63.2 |
| Gas Producing Factor | 2.91 | 3.05 | 1.44 | 3.00 | 0.83 |
| Carbon Producing Factor | 3.16 | 3.43 | 2.00 | 4.30 | 0.55 |

[1] Based on total recovery of gas, liquid, and carbon.
[2] Composition, weight per cent; $SiO_2$, 86.0, $Al_2O_3$, 13.5, $Fe_2O_3$, 0.16, NiO, 0.0074, $Cr_2O_3$, <0.001, $V_2O_5$, <0.0025, Na, <0.06 and Ca, <0/032.

It will be noted from the data presented above that the catalyst uncontaminated with any iron compounds resulted in a gas producing factor of less than one and a carbon producing factor of approximately 0.55. It will also be noted that the catalyst contaminated with metallic iron and with $Fe_2O_3$ resulted in gas producing factors of from 2.9 to 3.1 and carbon producing factors of from 3.2 to 4.3. In contrast, the catalyst containing $Fe_3O_4$ resulted in a gas producing factor of slightly greater than one and a carbon producing factor of approximately 2.0, both being substantially ½ of the magnitude for these quantities in the case of catalyst contaminated with metallic iron and with $Fe_2O_3$. It will be apparent from these data that when treating the alumina-silica catalytic cracking catalyst containing $Fe_2O_3$, the reducing conditions should be sufficiently severe to convert the $Fe_2O_3$ to $Fe_3O_4$ although not sufficiently severe to reduce any substantial amount of $Fe_2O_3$ to metallic iron.

The expression "D+L at 400° F." appearing as one of the activity test results is a measure of catalytic activity. This method of expressing catalyst activity (D+L at 400° F.) indicates the percentage of product distilled at 400° F. plus the distillation loss of the naphtha, which loss is obtained when testing the product obtained by passing a standard feed stock through the catalyst under standard conditions of temperature and pressure. This method of expressing catalyst activity has been widely adopted in the cracking industry.

The gas and carbon producing factors are determined by measuring the gas and carbon produced by passing a standard feed stock through the catalyst under standard conditions of temperature and pressure and comparing the amount of gas and carbon produced with the amount obtained when passing the same feed stock over a steam deactivated uncontaminated catalyst which will give the same gas oil conversion as does the catalyst in question.

The entry "conversion" in the table is essentially the D+L at 400° F. plus the dry gas plus the carbon produced and may be expressed mathematically in the following formula:

$$\text{Conversion} = 100 - (\text{vol. per cent liquid residue} \times \frac{\text{wt. per cent liquid (output basis)}}{100 \times \text{spec. grav. of liquid}} \times 0.856)$$

An advantage of the process of the present invention, irrespective of the prevention of the formation of excessive amounts of carbon and undesirable gases in the reaction step, is the elimination of the necessity of discarding large amounts of contaminated catalyst and replacing it with equal amounts of expensive fresh catalyst. Furthermore, this invention allows a given catalytic cracking unit to operate at a higher fresh feed charge rate because less residence time is required in the regenerator for removing the carbon from the catalyst by combustion.

Another saving inherent in the process of the present invention is that a greater proportion of the hydrocarbons in the feed stock is converted to valuable products rather than to carbon and undesirable fixed gases.

The present invention will be further illustrated by reference to the drawing in which Fig. 1 is a diagrammatic flow plan of a fluid catalyst type operation;

Figure 1:
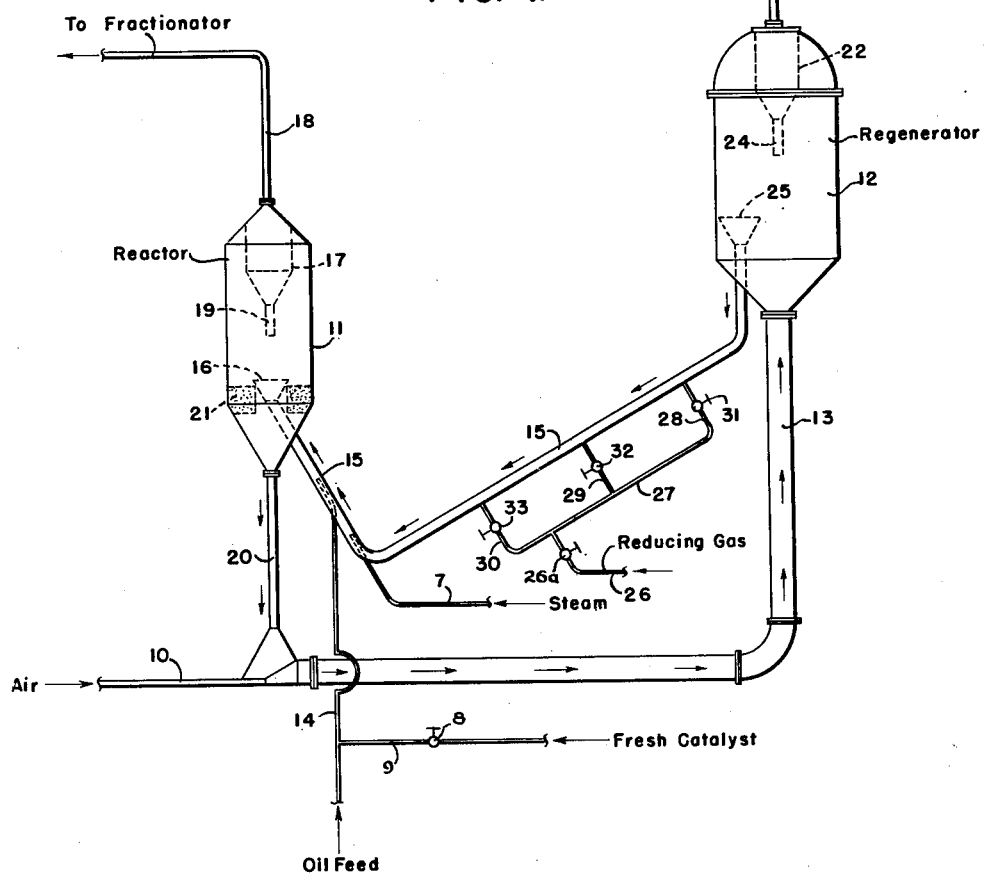

Referring now to the drawing and particularly to Fig. 1, numeral 11 designates a reactor vessel and numeral 12 designates a regenerator vessel connected by line 13 in which material flows from reactor 11 to regenerator 12. Line 15 also fluidly connects regenerator 12 and reactor 11, the regenerated catalyst from regenerator 12 flowing through line 15 into reactor 11. A hydrocarbon fraction boiling in the gas-oil boiling range is introduced into the system by way of line 14 which connects into line 15. Steam or other gases or vaporous material may be introduced into line 15 through line 7 to aid in moving regenerated catalyst from regenerator 12 to reactor 11.

Reactor 11 is of sufficient dimensions to allow the proper contact time for conversion of the feed hydrocarbons to lighter hydrocarbons. Reactor 11 is equipped with separating means 17, which is shown in the drawing by dotted lines, which may be suitably a cyclone separator. In separating unit 17 the finely divided catalyst is separated from the hydrocarbon vapors leaving reactor vessel 11 through line 18 through which they may be routed to a fractional distillation zone, not shown, for separation of desirable products. The finely divided catalyst separated from the hydrocarbon vapors by separating means 17 drops back into reactor vessel 11 by way of line 19 of separating means 17.

Catalyst dropping downwardly into reactor 11 leaves the reactor by way of line 20 after passage through a stripping zone indicated by grid work 21. Provision may be made in line 20 for injection of steam or inert gas to strip hydrocarbons from the catalyst dropping downwardly into line 20. Line 20 is connected into line 13 and as the catalyst flows downwardly therethrough, it is met by a blast of oxygen-containing gas introduced through line 10 and which causes the catalyst to flow by way of line 13 into regenerator vessel 12. Regenerator vessel 12 is a vessel of suitable dimensions to allow substantially complete combustion of the carbon deposited on the catalyst as a result of the conversion of hydrocarbons in reactor 11. Similar to reactor 11, regenerator vessel 12 is equipped with a separating means 22, which conveniently may be a cyclone separator, for removing the finely divided catalyst from the combustion gases resulting from the combustion reaction taking place in regenerator 12. The combustion gases flow from regenerator 12 by way of line 23 which may conduct them to an electrical separating means, not shown, for removal of any catalyst fines which may escape separating means 22. Separating means 22 is equipped with a leg 24 which allows finely divided catalyst separated from combustion gases by separating means 22 to drop downwardly into regenerator vessel 12.

Regenerator vessel 12 is equipped with a funnel-shaped member 25 connecting into line 15 by way of which regenerated catalyst substantially free of carbon is withdrawn from regenerator 12 for reuse in reactor 11 as previously described.

Ordinarily, the temperature maintained in reactor 11 is in the vicinity of 850° to 1050° F., while the temperature in the regenerator 12 is in the neighborhood of 1100° F. The higher temperature prevailing in regenerator 12 as compared to reactor 11 is due to the heat generated by the burning of carbon off the catalyst in the regenerator. Inasmuch as it is desirable for the catalyst entering reactor 11 to be in the neighborhood of reactor temperature and since regenerated catalyst leaving regenerator 12 through line 15 is in the neighborhood of 1100° F., the temperature of catalyst in line 15 may be reduced by introducing oil feed through line 14 at a temperature below that of the circulating catalyst.

Metallic contaminants entering regenerator 12 with catalyst through line 13 are converted in regenerator 12 by reason of their exposure to an oxidizing atmosphere to their higher oxides. Thus, the regenerated catalyst leaving regenerator 12 through funnel 25 and line 15 contains these higher oxides. The catalyst in line 15, before it is contacted with feed oil through line 14, is subjected to a reducing atmosphere, the reducing gas being introduced into line 15, from a source not shown, through line 26 and manifold 27. From manifold 27 reducing gas may flow into line 15 through lines 28, 29, or 30 which are controlled by means of valves 31, 32 and 33, respectively. When it is desired to introduce reducing gas into line 15 from a source not shown, valve 26a is opened while any one of valves 31, 32 or 33 may be opened while the remaining two are closed. Thus, by introducing reducing gas through lines 28, 29, or 30, the catalyst moving downwardly in line 15 may be subjected to a longer or shorter period of treatment as desired. It will also be understood that the temperature of the catalyst in line 15 as it is contacted by reducing gas introduced through line 26 and manifold 27 may be controlled by any heat regulating means, not shown, for controlling the temperature of the catalyst in line 15. The reducing gas introduced through line 26 and manifold 27 passes upwardly in line 15 in contact with catalyst flowing therethrough, into regenerator 12 and out through separating means 22 and line 23. Fresh make-up catalyst may be introduced into reactor 11 as required through line 9 controlled by valve 8, line 9 being in fluid communication with line 14.

Figure 2:
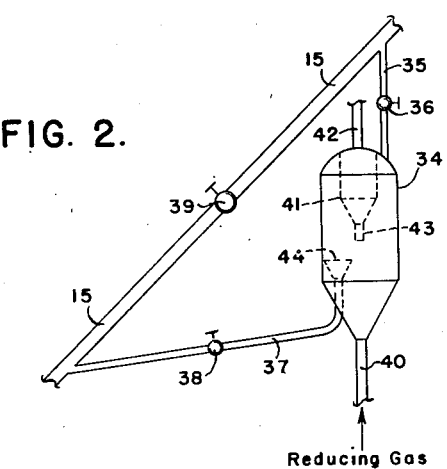
Fig. 2 is a diagrammatic flow plan of a variant of a part of the system shown in Fig. 1.

If desired, a separate reducing zone, such as that shown in Fig. 2, may be provided for contacting the regenerated catalyst in line 15 with a reducing gas. Thus, a reducing zone 34 may be provided adjacent line 15 and fluidly connected therewith by means of line 35 controlled by valve 36 and line 37 controlled by valve 38. In this modification a valve 39 is provided in line 15. When using this modification, catalyst from regenerator 12 (Fig. 1) is caused to flow into reducing zone 34 by closing valve 39 and opening valve 36 whereby catalyst flows from line 15 through line 35 into reducing zone 34. Reducing gas, from a source not shown, is introduced into zone 34 through line 40, a sufficient catalyst residence time being provided in zone 34 to permit conversion of undesirable metallic oxides to less detrimental constituents. The reducing gas moves upwardly in zone 34 and passes through separating means 41 and out of the system through line 42. Catalyst fines separated from reducing gas by means of separating means 41 are returned to reducing zone 34 through pipe 43. After being contacted by the reducing gas in zone 34, the catalyst enters funnel 44 and passes through line 37 to line 15. The temperature of reducing zone 34 may be controlled at any desired point by conventional means not shown.

Figure 3:
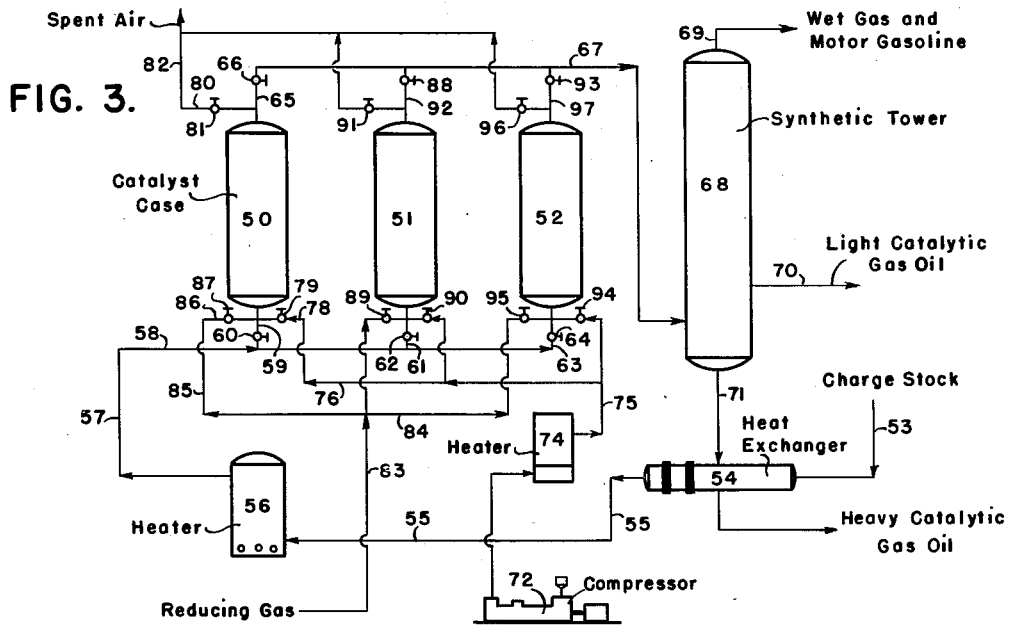
Fig. 3 is a diagrammatic flow plan of a fixed bed type catalytic cracking operation.

Referring to Fig. 3, the numerals 50, 51 and 52 designate a plurality of reaction vessels which may be operated in parallel. Each of vessels 50, 51 and 52 have formed therein in their lower portion a bed of catalyst in pellet form. The feed stock to be subjected to catalytic cracking is introduced into the system through line 53 and may be partially heated by passing it through heat exchanger 54. From heat exchanger 54 the partially heated charge stock flows through line 55 to charge heater 56 where it is brought to reaction temperature. From charge heater 56 the charge stock flows through line 57 into manifold 58 from which it may be introduced into either of reactors 50, 51 or 52 through line 59 controlled by valve 60, line 61 controlled by valve 62, or line 63 controlled by valve 64, respectively. Inasmuch as the operation in each of reaction vessels 50, 51 and 52 is identical, the operation of these vessels will be specifically described with respect to vessel 50 only. Vessel 50 during the reaction cycle is maintained at a sufficiently high temperature to maintain the charge stock introduced through line 60 in the vaporous state, the temperature maintained ordinarily in the vicinity of 850° F. to 1050° F. The cracked reaction products, together with unconverted charge stock is withdrawn from reactor vessel 50 through line 65 controlled by valve 66 and line 67 and is introduced into tower 68. In tower 68 the products from reactor vessel 50 may be separated into various components such, for example, as wet gas and motor gasoline withdrawn from tower 68 through line 69, light gas oil withdrawn through line 70 and a high boiling fraction withdrawn through line 71. Reaction vessel 50 is maintained on the conversion cycle until the catalyst contained therein declines in activity due to the deposition of carbon thereon at which time the introduction of charge stock is discontinued. The catalyst in reaction vessel 50 is then subjected to a regeneration cycle during which an oxygen-containing gas such as air is compressed in a compressor 72 and introduced into vessel 50 through line 73, air heater 74, line 75, line 76, line 77 and line 78 controlled by valve 79. Combustion gases from the regeneration of the catalyst in vessel 50 are withdrawn from the vessel through line 65, line 80 controlled by valve 81, and line 82, the said combustion gases being vented to the atmosphere or otherwise disposed of. Ordinarily the catalyst in vessel 50 will be maintained in the neighborhood of 1100° F. during the regenerating step. While the oxygen-containing gas is being introduced into vessel 50 during the regeneration step valve 60 in line 59 is closed to prevent entrance of charge stock to the reactor while valve 66 in line 65 is also closed to prevent combustion gases from entering tower 68 through line 67.

Metallic contaminants introduced into reactor vessel 50 with the charge stock are deposited during the reaction cycle on the catalyst in the vessel. These contaminants are converted to their higher oxide during the regeneration cycle by reason of their exposure to the oxygen-containing gas during the said cycle. Thus on completion of the regeneration step the metallic contaminants introduced with the feed are present on the catalyst in the form of their higher oxides. In order to convert the higher oxides to a non-detrimental form, a reducing gas is introduced into reactor vessel 50 through line 83, manifold 84, line 85, line 86 controlled by valve 87, and line 59. While reducing gas is being introduced into vessel 50, valves 60, 79 and 66 are closed while valve 81 is opened. With valve 81 in the open position the reducing gas introduced into vessel 50 is permitted to escape therefrom through lines 80 and 82.

On completion of the step of contacting the catalyst in vessel 50 with a reducing gas as above described, vessel 50 may then be returned to the conversion cycle by closing valves 79 and 81 and opening valves 60 and 66, the pressure and temperature of vessel 50 being adjusted to accomplish conversion therein. Although not shown, vessel 50 as well as vessels 51 and 52 may be equipped with heat regulating and control equipment for maintaining the desired temperature therein.

The catalyst in vessels 51 and 52, of course, may be subjected to the sequence of steps hereinbefore described with reference to vessel 50. As previously indicated, while vessel 50 is being employed to convert charge stock to desired products, vessel 51 may be undergoing regeneration while the catalyst in vessel 52 is subjected to contact with a reducing gas. Of course, with the system shown vessels 50, 51 and 52 may all be operated on the same cycle simultaneously although ordinarily it will be found preferable to operate the vessels in sequence. Inasmuch as vessels 50, 51 and 52 operate in a manner similar to the manner in which vessel 50 is operated, as is hereinbefore described, the only remaining feature which will be described is the manipulation of the valves necessary for the operation of vessels 51 and 52.

When it is desired to place vessel 51 on the conversion cycle valve 62 and valve 88 are open while valve 89, valve 90 and valve 91 are closed. With the valves in these positions, charge stock flows into vessel 51 through line 61 and reaction products flow from vessel 51 through line 92 and line 67 to tower 68. When it is desired to regenerate the catalyst in vessel 51, valves 62 and 92 are closed and valves 90 and 91 are open. On completion of the regeneration cycle and when it is desired to subject the catalyst in vessel 51 to the reducing gas, valve 90 is closed and valve 89 is opened. On completion of this cycle the conversion cycle may then again be initiated.

When it is desired to place vessel 52 on the conversion cycle valves 64 and 93 are opened while valves 94, 95 and 96 are closed. With the valves in these positions, charge stock flows into vessel 52 where it is contacted with the catalyst contained therein and reaction products are withdrawn therefrom through lines 97 and 67 and introduced into tower 68 where the said products may be separated. When it is desired to initiate the regeneration cycle in vessel 52, valves 64 and 93 are closed and valves 94 and 96 are opened, thus excluding charge stock from vessel 52 and permitting the oxygen-containing gas to flow therethrough. On completion of the regeneration cycle and when it is desired to subject the catalyst in vessel 52 to contact with the reducing gas, valve 94 is closed and valve 95 is opened. After the catalyst in vessel 52 has been so contacted for a sufficient period of time, vessel 52 may be returned to the conversion cycle by opening valves 64 and 97 and closing valves 95 and 96.

Figure 4:
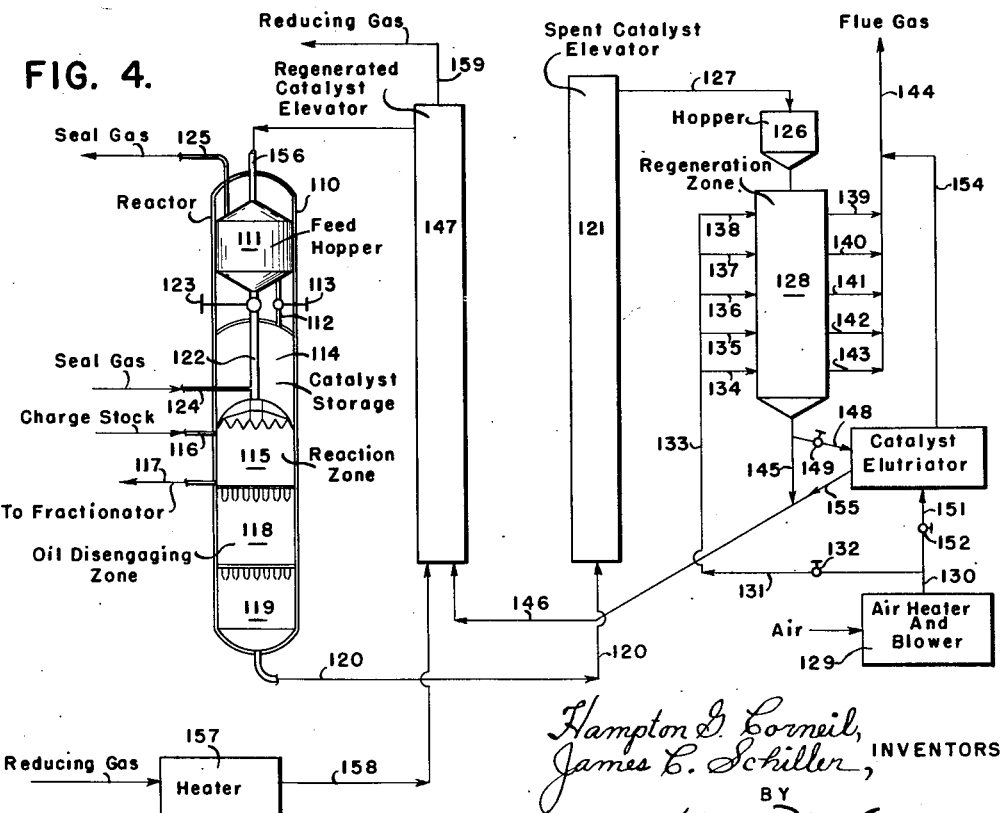
Fig. 4 is a diagrammatic flow plan of a moving bed type catalytic cracking process.

Referring to Fig. 4 of the drawing, numeral 110 designates a reactor vessel in which a suitable catalyst in the form of pellets of substantial size is formed into a moving bed and contacted with the charge stock previously heated to a temperature which is determined by the temperature which it is desired to maintain in the cracking zone. Reactor vessel 110 consists of several component parts. Feed hopper 111 is located in the upper part of reaction vessel 110. Catalyst is fed into hopper 111, in a manner which will hereinafter be described, from which it flows downwardly through line 112 controlled by valve 113 into catalyst storage zone 114 and thence downwardly into reaction zone 115. Heated charge stock is introduced into reaction zone 115 through line 116 where it contacts the bed of moving catalyst in reaction zone 115. Reaction products resulting from the conversion which takes place in reaction zone 115 are withdrawn from said zone through line 117 and are transported to equipment not shown for separating and recovering the desired product. Catalyst leaving reaction zone 115 passes downwardly into oil disengaging zone 118 where means, not shown, are provided for disengaging oil vapors and adsorbed oil from the spent catalyst. The catalyst then drops into the bottom portion 119 of reactor vessel 110 from which it is transported through line 120 to spent catalyst elevator 121.

Loss of hydrocarbon vapors out of the top of reaction zone 115 is prevented by providing a gas seal in reactor vessel 110. This is accomplished by introducing a compressed inert seal gas, such for example, as flue gas, into catalyst seal leg 122 controlled by valve 123 located between feed hopper 111 and reaction zone 115. The seal gas may be introduced into catalyst seal leg 122 by means of line 124. The main part of the seal gas introduced through line 124 is vented to the atmosphere from feed hopper 111 through line 125. The length of catalyst seal leg 122 is sufficient to provide a pressure drop exceeding the reactor pressure.

Spent catalyst elevator 121 elevates the catalyst introduced therein through line 120 to the top of hopper 126 through line 127. The spent catalyst flows from hopper 126 into regeneration kiln 128 through which the catalyst flows downwardly by gravity. The carbonaceous deposit on the catalyst is removed by subjecting the catalyst to a combustion supporting gas, such as air, under regeneration conditions. Air is heated to the proper temperature and compressed to the proper pressure in air heater and blower 129 from which it flows to regeneration kiln 128 through line 130, line 131 controlled by valve 132, manifold 133 and lines 134, 135, 136, 137 and 138. Combustion gases are withdrawn from regenerator kiln 128 through lines 139, 140, 141, 142 and 143, all of which are discharged into flue gas stack 144. Regenerated catalyst flows by gravity from regenerator kiln 128 through line 145 and 146 to regenerated catalyst elevator 147.

The catalyst within the system may be maintained at the desired maximum particle size by removing catalyst fines from the catalyst by suitable means. For example, a portion of the catalyst may be withdrawn from line 145 either intermittently or continuously through line 148 controlled by valve 149 and passed through a catalyst elutriator 150. In catalyst elutriator 150 fines are separated from the catalyst with a current of air introduced through line 130 and line 151 controlled by valve 152. This air, together with suspended fines removed from the catalyst in elutriator 150, is vented to flue gas stack 144 through lines 153 and 154. Catalyst from which the fines have been removed is withdrawn from catalyst elutriator 150 through line 155 which is connected to line 146 and is returned together with regenerated catalyst from line 145 to regenerated catalyst elevator 147.

Catalyst elevator 147 transports the regenerated catalyst to the top of reactor vessel 110 where it is discharged into feed hopper 111 through line 156. A regenerated catalyst passing upwardly through elevator 147 is contacted with a reducing gas which is heated in heater 157 and introduced into the lower end of elevator 147 through line 158. The reducing gas so introduced passes upwardly through elevator 147 contacting concurrently the regenerated catalyst passing therethrough and is withdrawn from elevator 147 through outlet line 159. The amount of reducing gas introduced into catalyst elevator 147 and the temperature of the catalyst in the elevator are controlled so as to convert a substantial portion of the contaminating metallic oxides to forms which are less detrimental to the activity of the catalyst in converting hydrocarbons in reaction zone 115.

The nature and objects of the present invention having been fully described and illustrated, what we wish to claim as new and useful and to secure by Letters Patent is:

1. A method for treating a silica-alumina catalyst employed for the conversion of hydrocarbons in a catalytic cracking operation wherein the catalyst is subjected to contact with hydrocarbons under conversion conditions and to contact with a combustion supporting gas under regeneration conditions, said catalyst being contaminated with $Fe_2O_3$ in an amount no greater than about 0.5% by weight, which includes the steps of subjecting at least a portion of the regenerated catalyst to the action of a reducing gas in an amount and under conditions sufficiently severe to convert said $Fe_2O_3$ to $Fe_3O_4$ although not sufficiently severe to reduce any substantial amount of $Fe_2O_3$ to metallic Fe.

2. A method for treating a silica-alumina catalyst employed for the conversion of hydrocarbons in a catalytic cracking operation, said catalyst beign contaminated with $Fe_2O_3$ in an amount no greater than about 0.5% by weight, which includes the steps of regenerating said catalyst by combustion in the presence of an oxygen-containing gas at a temperature in the range between 850° F. and 1100° F., recovering the regenerated catalyst from said combustion operation, subjecting at least a portion of the regenerated catalyst to contact with a vaporous medium containing a reducing gas in a sufficient amount at a temperature in the range between 850° F. and 1100° F. and under conditions sufficiently severe to reduce said $Fe_2O_3$ to $Fe_3O_4$ although not sufficiently severe to reduce any substantial amount of $Fe_2O_3$ to metallic Fe, discontinuing the contact of said catalyst with said vaporous medium, and subjecting said catalyst to contact with a heated hydrocarbon under conditions to cause cracking of said hydrocarbon.

3. A process in accordance with claim 2 in which the reducing gas is hydrogen.

4. A process in accordance with claim 2 in which the reducing gas is carbon monoxide.

5. A process in accordance with claim 2 in which the reducing gas consists of at least one hydrocarbon having not more than three carbon atoms per molecule.

HAMPTON G. CORNEIL.
JAMES C. SCHILLER.

REFERENCES CITED

The following references are of record in the file of this patent:

UNITED STATES PATENTS

| Number | Name | Date |
|---|---|---|
| 2,348,418 | Roesch et al. | May 9, 1944 |
| 2,366,372 | Voorhees | Jan. 2, 1945 |
| 2,408,943 | Mekler | Oct. 8, 1946 |
| 2,421,677 | Belchetz | June 3, 1947 |